United States Patent
Bath et al.

(12)

(10) Patent No.: US 6,273,491 B1
(45) Date of Patent: Aug. 14, 2001

(54) METHOD AND APPARATUS FOR RELEASABLY MOUNTING TONNEAU COVERS

(76) Inventors: John Bath, 22332-3A Pine Arbor Dr., Elkhart, IN (US) 46516; Devon Eb, 28065 C.R. 46, Nappanee, IN (US) 46550; Dennis Herrmeyer, 387 Roxbury Park, Elkhart County, IL (US) 46516

( * ) Notice: Subject to any disclaimer, the term of this patent is extended or adjusted under 35 U.S.C. 154(b) by 0 days.

(21) Appl. No.: 09/432,468

(22) Filed: Nov. 3, 1999

(51) Int. Cl.[7] ...................................................... B60P 7/02
(52) U.S. Cl. ............................... 296/100.01; 296/100.06; 296/100.07; 16/298; 16/319
(58) Field of Search ........................ 296/100.02, 100.06, 296/100.07, 100.08, 100.1; 16/319, 298, 277; 292/216, 225, 196, DIG. 29, DIG. 43

(56) References Cited

U.S. PATENT DOCUMENTS

| | | | |
|---|---|---|---|
| 185,613 | * | 12/1876 | Wolfinger ................................ 16/277 |
| 900,336 | * | 3/1908 | Williams ................................ 16/319 |
| 2,989,340 | * | 6/1961 | Penner ................................ 296/100.1 |
| 3,704,039 | * | 11/1972 | Dean ................................ 296/100.07 |
| 3,785,698 | * | 1/1974 | Dean et al. ................................ 296/100.07 |
| 3,923,334 | * | 12/1975 | Key ................................ 296/100.07 |
| 4,124,247 | * | 11/1978 | Penner ................................ 296/100.07 |
| 4,135,273 | * | 1/1979 | Holmes ................................ 16/319 |
| 4,762,360 | * | 8/1988 | Huber ................................ 296/100.07 |
| 4,773,126 | * | 9/1988 | Voss ................................ 296/100.08 |
| 5,018,777 | * | 5/1991 | Swenson et al. ................................ 296/100.07 |
| 5,150,934 | * | 9/1992 | Grody ................................ 292/DIG. 29 |
| 5,205,015 | * | 4/1993 | Huang ................................ 16/319 |
| 5,228,739 | * | 7/1993 | Love ................................ 296/100.02 |
| 5,322,336 | * | 6/1994 | Isler ................................ 296/100.1 |
| 5,445,326 | * | 8/1995 | Ferro et al. ................................ 292/DIG. 43 |
| 5,513,420 | * | 5/1996 | Kennedy ................................ 16/298 |
| 5,600,868 | * | 2/1997 | Topurville et al. ................................ 16/277 |
| 5,632,522 | * | 5/1997 | Gaitan et al. ................................ 296/100.06 |
| 5,743,586 | * | 4/1998 | Nett ................................ 296/100.02 |
| 5,909,921 | * | 6/1999 | Nesbeth ................................ 296/100.1 |
| 5,957,525 | * | 9/1999 | Nelson ................................ 296/100.06 |
| 5,992,908 | * | 11/1999 | Yared et al. ................................ 292/196 |
| 6,059,327 | * | 5/2000 | Yoshikuwa ................................ 292/216 |

* cited by examiner

Primary Examiner—Joseph D. Pape
Assistant Examiner—Kiran B. Patel
(74) Attorney, Agent, or Firm—Ryan M. Fountain

(57) ABSTRACT

A tonneau cover is provided which has at least one hinge-mounted latch adjacent the front of the cover, at least one support prop along the side of the cover intermediate the front and rear of the cover, and at least one latch mounted adjacent the rear of the cover, with a pair of independent side rails mounted to the vehicle, at least one of which contains a bracket for releasably receiving the hinge-mounted latch, a support prop receiving bracket cantilevered below and away from the vehicle side wall, and a rear catch bracket for receiving the rearward latch independent of dimensional variations induced from thermal forces over the cover. To facilitate release of the hinge-mounted latch within close confines of the front area of the vehicle bed, a self-contained trip handle is included in the receiving bracket. To prevent the support props from inadvertently damaging the vehicle during installation or removal of the cover, clips are provided to fix the free end of the props to the cover once it is removed from the rail mounted bracket. Dampening magnets or weights are provided to offset thermal expansion of the cover, and leveling nips are provided to offset thermal contraction of the cover. To facilitate proper alignment of the hinge-mounted latch with the rail mounted bracket during installation, a self-centering spring arrangement is provided. Further, to minimize projection of the mounting system away from the vehicle, the rails can be formed to conform to the wall portion of the vehicle portion to which they are mounted.

10 Claims, 9 Drawing Sheets

METHOD AND APPARATUS FOR RELEASABLY MOUNTING TONNEAU COVERS

BACKGROUND AND SUMMARY OF THE INVENTION

The present invention relates generally to covers for the bed of pick up trucks, and, more particularly, to apparatus for releasably mounting tonneau covers.

Certain motor vehicles, such as pick up trucks and the like, are constructed with an exterior cargo area or bed, usually toward the rear of the vehicle and behind the cab portion that is for the driver or other occupants. Such cargo beds can be convenient and readily accessible. However, in the vehicle as provided by the original manufacturer, the bed is typically exposed to the elements. Thus, any cargo within the bed would also be exposed to the elements while being transported or stored in the bed. Also, it has been found that the fuel economy of pick up trucks can be adversely affected by the wind resistance or drag of the exposed cargo bed.

In response to such disadvantages, pick up trucks users have previously mounted rigid caps, typically molded from fiberglass, over the cargo bed. These caps appear to form an extension of the driver cab by effectively adding height and a roof to the cargo bed. Access to the bed for loading and unloading of cargo is provided by one or more doors through the cap. Often, however, caps are relatively expensive and frequently too heavy and/or bulky for quick removal if oversized cargo is to be hauled. In addition, some caps interfere with the driver's rearward visibility. As an alternative, lighterweight tonneau covers have been secured to the top area of the walls of the cargo bed. These covers are generally flush, or nearly so, with the top of the vehicle bed walls when closed on the bed and can be lifted up in whole or part on hinges to provide access to the bed. When closed, the covers are typically latched in place, and those latches can include keyed locks for cargo security.

A wide variety of tonneau covers are presently used within the industry for covering the bed of a pick up truck. A number of factors have determined the desirability of given tonneau cover designs. For example, it has generally been found to be advantageous for the lid to match the styling of the pick up truck and appear to be an integral part of it. In that regard, it is preferable for the lid to present as low a profile as possible to the vehicle front and side walls and tailgate surrounding the bed.

Some of these prior tonneau covers are permanently attached to the pick up truck. However, if cargo is to be hauled in the bed of the pick up truck that exceeds the height of the bed walls, permanently mounted tonneau covers could not be conveniently used. For that reason, some tonneau covers have been marketed that are removably mounted to the pick up truck. Among removable tonneau covers, there are rigid and flexible cover varieties. Rigid covers provide greater protection for the cargo under the tonneau cover and generally have greater durability over long periods of use. Rigid covers also can be made to require less maintenance than some flexible tonneau covers. However, rigid tonneau covers tend to be heavier and have typically required more than one person to install it on the pick up truck, primarily due to the cover weight and the alignment precision and coordination needed with prior installation or mounting systems.

These prior mounting systems have generally been of two types, those that penetrate a portion of the truck body or have a detachable portion that is permanently fixed to the vehicle, and those that are merely clamped to the vehicle and completely removable. Where the mounting system penetrates the side wall of the truck bed, for example, the tonneau cover can be positively located with respect to the vehicle with a minimum of sliding relative thereto during use. However, in many situations, systems that penetrate a portion of the vehicle or are permanently attached even in part are not desirable from the standpoint of preventing corrosion, maximizing truck bed usage alternatives and preserving full vehicle aesthetics. At the same time, with some prior clamping mounting systems it has been necessary to be especially careful that the clamps are properly positioned and the cover is securely mounted. If the clamps are not properly positioned, even if the cover is secure against movement off of the vehicle, the weather seals and latching mechanisms may not function properly.

Further, even when the clamps are properly aligned when initially installed on the vehicle, situations can arise where the weather seals and latching mechanisms may cease to function properly. For example, rigid tonneau covers have been constructed from a variety of materials, such as fiberglass and ABS plastics, or combinations of materials. Initially, these covers are typically closely mounted to the top of the bed walls of the pick up truck. However, over time and varying temperature conditions sagging and/or bulging can occur over the length and width of the cover. In addition to its impact on appearance and structural integrity, this sagging or bulging can cause misalignment of the hardware used to install and latch the tonneau covers. Thus, the cover may not close properly and/or adequately secure the tonneau to the pickup truck in certain situations. In addition, deformation of the cover and/or portions of the bed walls can occur due to uneven application of or support for the cover load by the mounting and/or latching hardware. This deformation can similarly have adverse impact upon the mounting and closing system as well as the aesthetic appearance of the vehicle.

Other concerns with prior removable covers arise from the procedures needed to remove the cover. For example, in many covers prop arms are used to support the cover when it is opened. The prop arms are typically fixed at one end to the cover and removably secured to a bracket connected to the vehicle at the other end. When removing the prop arm from the bracket to remove the cover from the vehicle, special care must be taken not to let the prop arm swing freely about its other end and scratch the paint off a portion of the vehicle.

At the same time, however, since the prop arm supports at least a substantial portion of the cover weight when the cover is opened, it is necessary that the arm be securely retained in the bracket when in use. Further, the bracket is preferably removable with the mounting system and does not need to be attached to the vehicle in a way the penetrates or damages the vehicle. Also, while it is advantageous to have a prop arm that provides as much lift assistance as possible to opening of the cover, it is important that the prop arm bracket not detrimentally affect or interfere with the mounting system.

In addition, some prior covers required specific elevated or inclined orientations of the cover to be maintained in order to disconnect the cover from the mounting system components. To the extent such orientations departed from the horizontal plane there is risk that a sudden gust of wind could shift the cover out of control of the user. Further, to the extent that elevation significantly above the top of the bed walls there is greater risk of injury to the user if that control of the cover is lost. It has been suggested to minimize these latter two concerns by using light but strong materials to form the cover, such as Telene, but such covers have thus far exhibited even greater thermal expansion characteristics than older, heavier materials.

Similarly, mounting some prior frames or support rails for the tonneau covers has been relatively awkward and complex. Typically, the cover has been supported by a U-shaped rail frame, such as the type shown in U.S. Pat. No. 5,688,017. While such frames can have minimal weight, given the width of the vehicle bed and the resulting dimensional separation of the side wall rails, lifting such frames into position and securing them to the vehicle, or later removing them, has often required the work of at least two persons.

At the same time, the market for tonneau covers has traditionally been highly competitive, with consumers being very cost conscious. To the extent prior systems have attempted to provide for easier cover installation, they have generally resulted in systems that are more expensive to manufacture.

Accordingly, it is an object of the present invention to provide an improved method and apparatus for releasably mounting tonneau covers to a pick up truck. Other objectives include the provision of a tonneau cover mounting arrangement that:

a. is easy to install onto a vehicle and securely retains the cover to the vehicle,
b. permits the cover to be readily removed from the vehicle with or without removing the mounting frame from the vehicle,
c. provides greater user control over the cover during cover installation and removal,
d. accommodates thermal induced dimensional variation in the cover without loss of weather seal or of mounting or closure latching control,
e. permits more consistent manufacturing process results and improved product quality,
f. maintains a minimal profile over the top of the bed walls, and
g. is easier to open and close and minimizes destructive stresses on the vehicle support.

These and other objects of the present invention are obtained by the provision of a tonneau cover having at least one hinge-mounted rotary latch adjacent the front of the cover, at least one support prop along the side of the cover intermediate the front and rear of the cover, and at least one rotary latch mounted adjacent the rear of the cover, with a pair of independent side rails mounted to the vehicle, at least one of which contains a bracket for releasably receiving the hinge-mounted rotary latch, a support prop receiving bracket cantilevered below and away from the vehicle side wall, and a rear catch bracket for receiving the rearward rotary latch independent of dimensional variations induced from thermal forces over the cover. To facilitate release of the hinge-mounted rotary latch within close confines of the front area of the vehicle bed, a self-contained trip handle is included in the receiving bracket. To prevent the support props from inadvertently damaging the vehicle during installation or removal of the cover, clips are provided to fix the free end of the props to the cover once it is removed from the rail mounted bracket. Dampening magnets or weights are provided to offset thermal expansion of the cover, and leveling nibs are provided to offset thermal contraction of the cover. To facilitate proper alignment of the hinge-mounted rotary latch with the rail mounted bracket during installation and usage under a variety of conditions, a self-centering spring arrangement is provided. Further, to minimize projection of the mounting system away from the vehicle, the rails can be formed to conform to the wall portion of the vehicle portion to which they are mounted.

Other objects, advantages and novel features of the present invention will now become readily apparent to those in the art from the following detailed description and attached drawings.

DETAILED DESCRIPTION OF PREFERRED EMBODIMENTS

Figure 1:
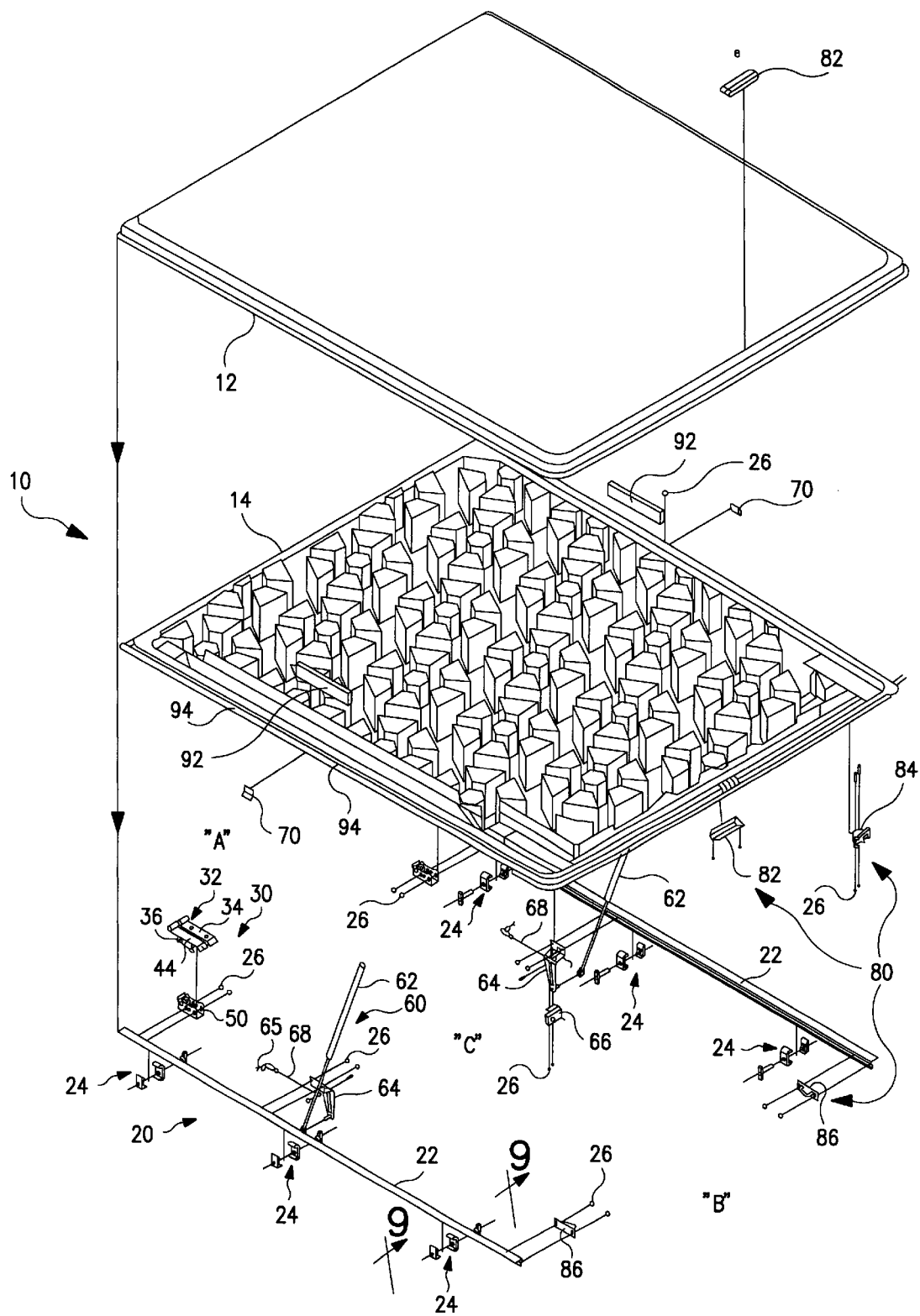
FIG. 1 shows a top, left exploded perspective view of a tonneau cover mounting apparatus according to the teachings of the present invention.
Figure 2:
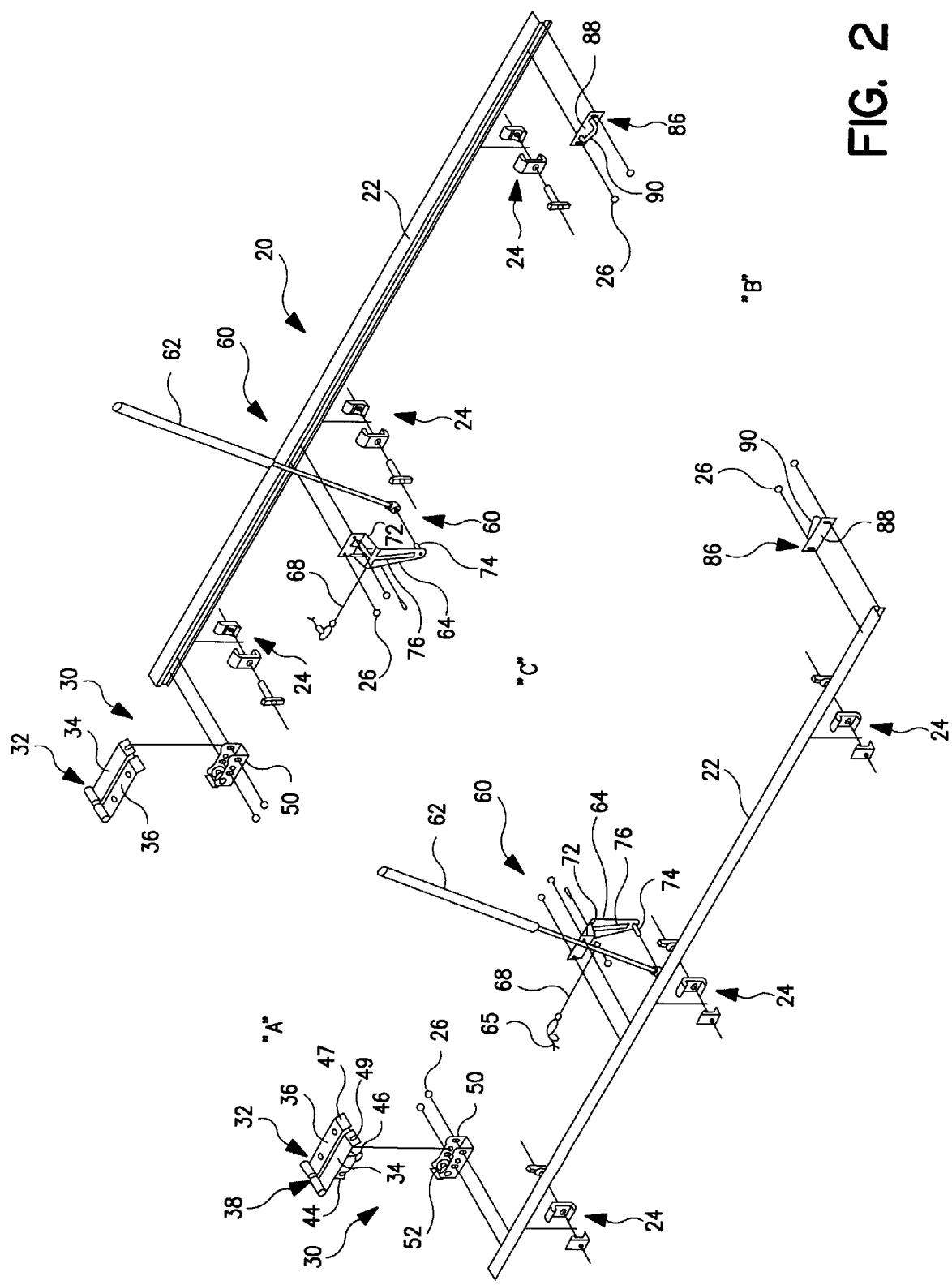
FIG. 2 shows an enlarged view of the mounting apparatus of FIG. 1 from the same perspective with the tonneau cover shell and liner omitted, with the associated vehicle shown in phantom.
Figure 3:
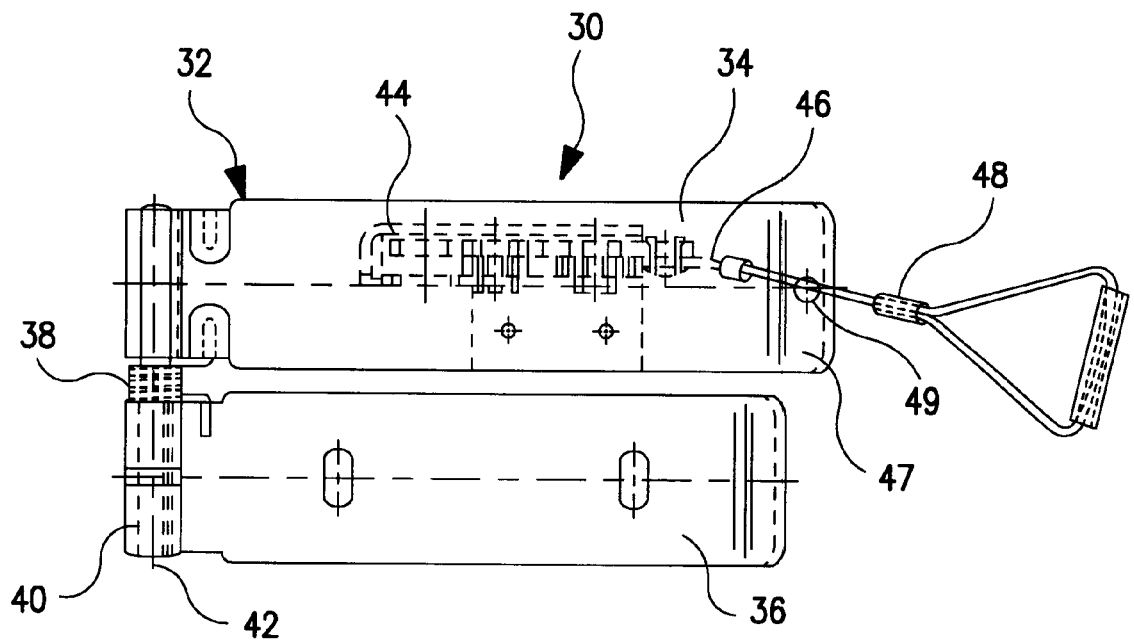
FIG. 3 shows a further enlarged top view of the hinge-mounted rotary latch assembly of FIG. 1 with the conventional rotary latch portion shown in phantom.
Figure 4:
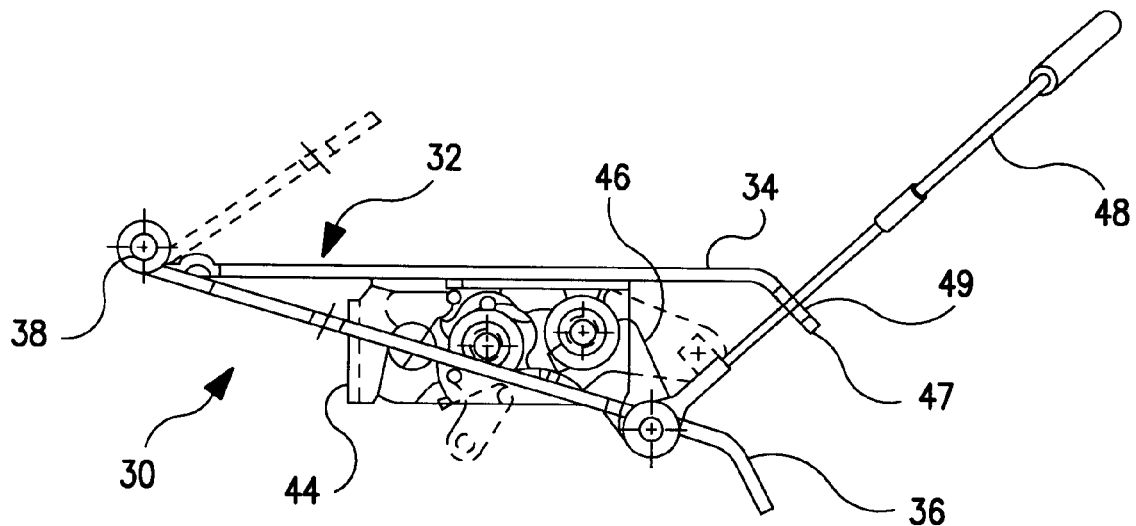
FIG. 4 shows a side view of the hinge-mounted rotary latch assembly of FIG. 3, with elevated positions of the assembly elements shown in phantom.
Figure 5:
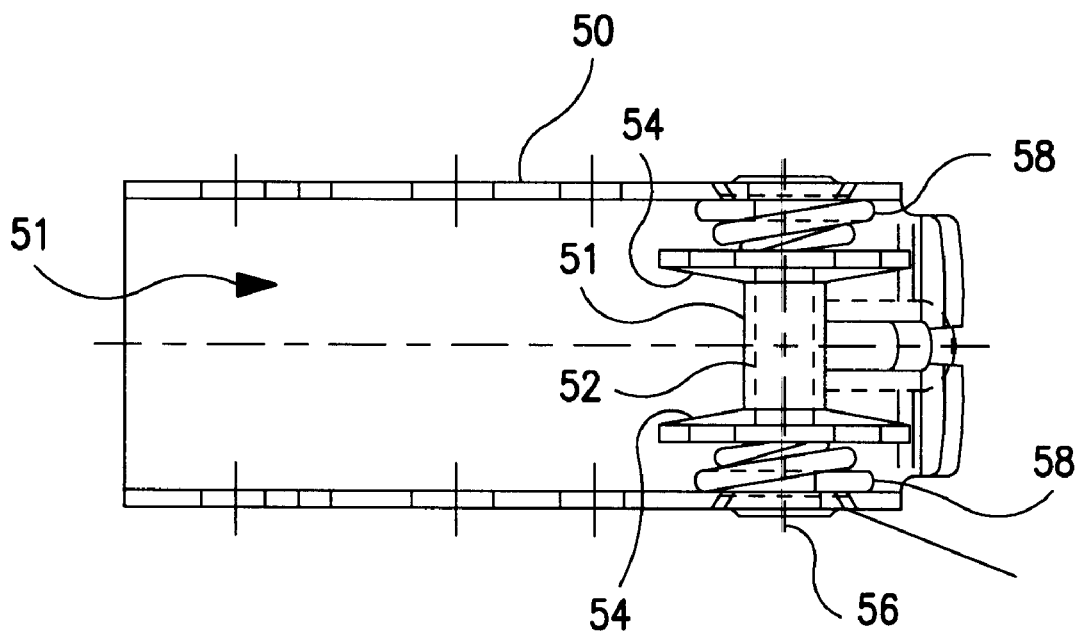
FIG. 5 shows a further enlarged top view of the self-centering bracket for receiving the hinge-mounted rotary latch of FIG. 3.
Figure 6:
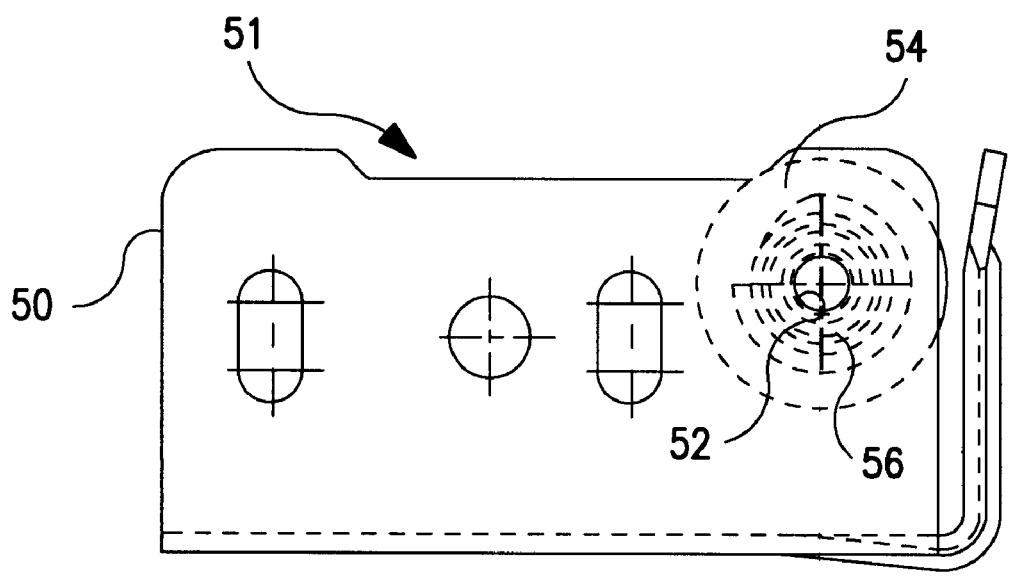
FIG. 6 shows a side view of the self-centering bracket of FIG. 5.
Figure 7:
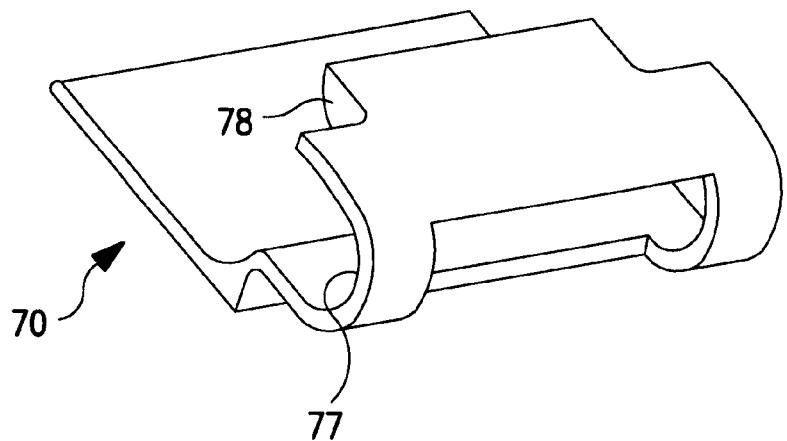
FIG. 7 shows a further enlarged top rear left perspective view of a prop clip of FIG. 1.
Figure 8:
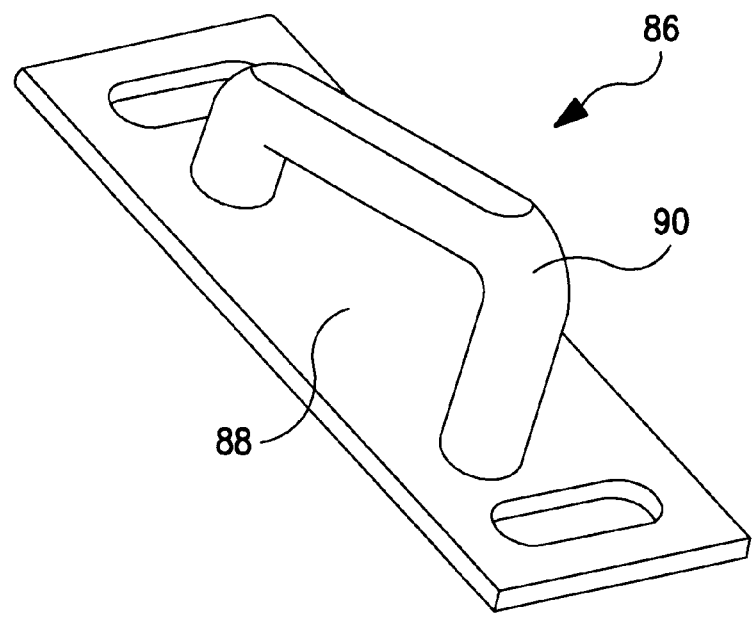
FIG. 8 shows a further enlarged top right perspective view of the rear catch bracket of FIG. 1.

FIG. 1, which illustrates a preferred embodiment of the present invention, shows a tonneau cover 10, including an outer cover or shell 12, inner liner 14 and rail mounting arrangement 20. By way of orientation, the "front" of the cover and vehicle is toward point A and the "rear" of the cover and vehicle is toward point B. Similarly, "inwardly" is toward point C within the area of the vehicle bed, and "outwardly" is away from point C. It will be understood that shell 12 and liner 14 can be formed from any conventional materials, such as fiberglass.

However, in especially preferred embodiments, shell 12 is formed from "Telene" material, a proprietary product of B. F. Goodyear, Inc., and liner 14 is formed from ABS plastic. Telene material could be used for liner 14 in alternative embodiments, depending upon the relative costs of ABS and Telene under current market conditions. At present, ABS is a less expensive alternative. Telene has been found to provide a better surface quality than fiberglass materials, at least in part because it can be formed to the desired shapes using closed molds. Telene also permits shell 12 to have a lower overall weight than with conventional fiberglass, thus reducing the forces which urge the cover to sag. Such Telene shells and ABS liners are then bonded together by, for example, a conventional two-part urethane adhesive. It will usually be preferable to select the particular ABS material to closely coincide with the thermal expansion characteristics of the Telene material so as to minimize the internal stresses on the composite assembly of the combined shell and liner.

Figure 9:
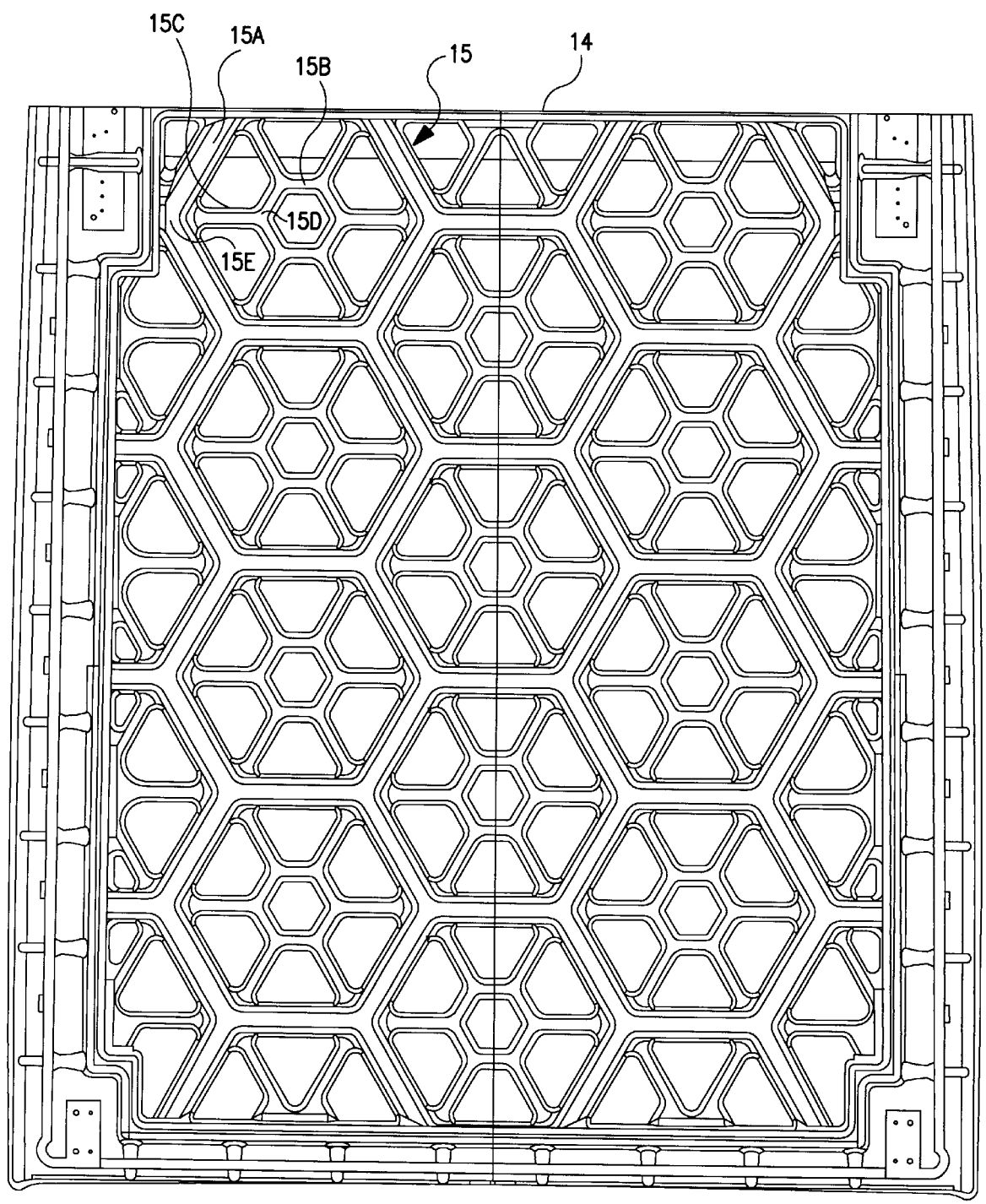
FIG. 9 shows an enlarged, bottom plan view of the underside of the tonneau cover liner of FIG. 1.
Figure 9A:
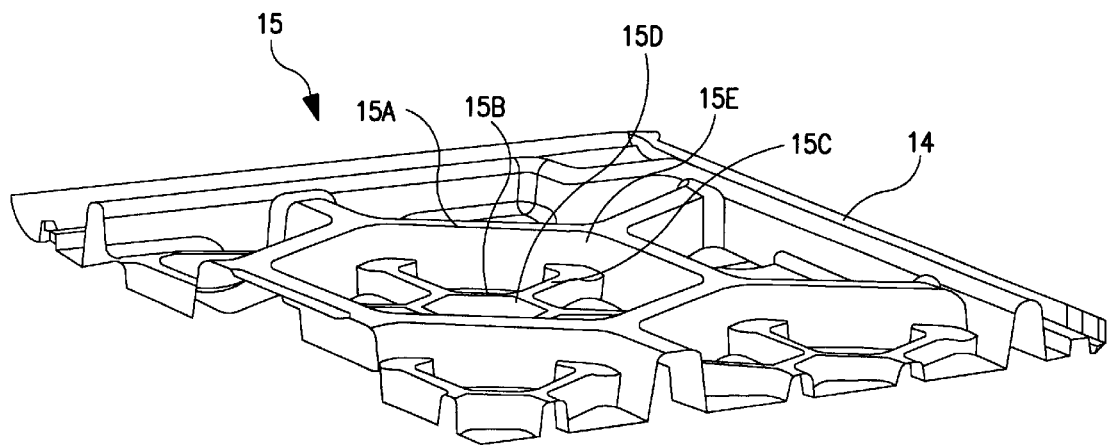
FIG. 9A shows a further enlarged, cross-sectional perspective view of the rear right underside corner of the tonneau cover liner of FIG. 1.
Figure 9B:
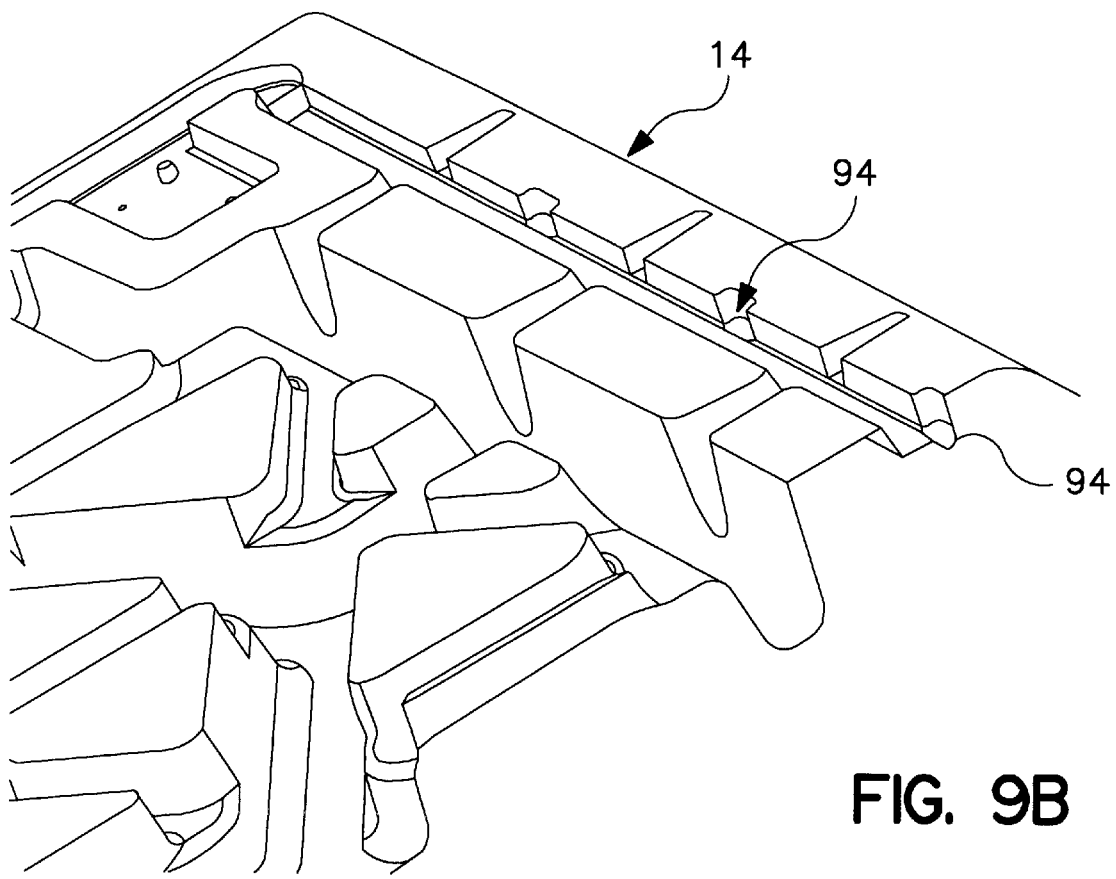
FIG. 9B shows a still further enlarged, cross-sectional perspective view of the top surface of the tonneau cover liner of FIG. 1 over the right underside corner of FIG. 9.

In order to provide greater strength and rigidity for the overall tonneau cover 10, liner 14 is preferably molded to have a pattern of ribs or ridges 15 on its underside. One such suitable pattern of ribs that provides for adequate strength without being unduly difficult or expensive to manufacture is shown in FIGS. 9, 9A and 9B. In effect, the pattern is a series of outer hexagons 15A of a given height from the liner surface, each with a concentric inner hexagon 15B of a lower height from the liner surface, with spokes 15C projecting from each corner 15D of the inner hexagons to the corresponding corner 15E of the outer hexagon. Stated differently, outer hexagons 15A of the basic ridge pattern on the bottom surface of liner 14 each include an internal "spoking trapezoid" configuration of lessor vertical projection to increase the liner rigidity and avoid complicated molding configurations. As a result, the composite Telene shell and ABS liner can present a lower overall profile to the vehicle body without increasing the risk of sagging configuration.

Rail mounting arrangement 20 includes, for example, two longitudinally extending rails 22, each preferably being a mirror image of the other. These rails are, for example, formed as an extruded, stamped or roll formed length of metal, such as steel or aluminum. Each rail 22 is typically releasably secured to the side walls of the vehicle bed adjacent the top of those side walls via a plurality of clamps 24. Preferably, rails 22 are formed to closely conform to the shape of the wall of the vehicle against which they are clamped. A variety of conventional clamps can be accommodated by rails 22.

Figure 9C:
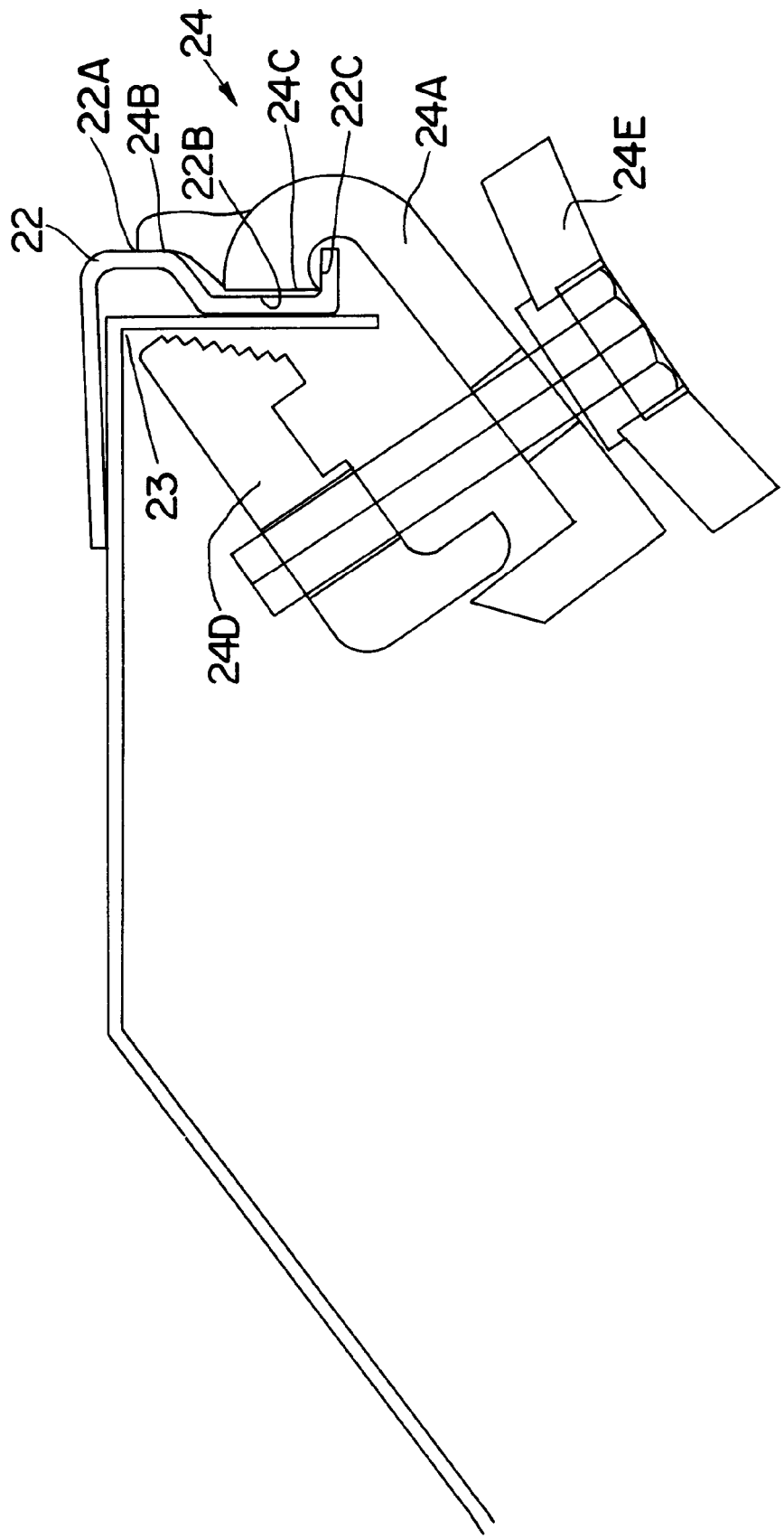
FIG. 9C shows an enlarged, cross-sectional side view of the clamp, rail and vehicle connection of FIG. 1 along line 9—9.

In especially preferred embodiments, rails 22 are formed with an upper flat 22A, a recessed flat 22B and a lower lip 22C. Clamps 24 are then preferably formed to engage all three of these aspects of rails 22 and exert a stable force against both vertical and horizontal shifting of rails 22 with respect to the vehicle body by a "pull down" effect against the interior corner 23 of the vehicle side wall. For example, as shown in FIG. 9C, each clamp 24 includes a rail engaging portion 24A, with upper bearing surface 24B to abut upper flat 22A, and a lower bearing surface 24C to abut recessed flat 22B and lower lip 22C. Clamps 24 each also include a vehicle engaging portion 24D which abuts rail engaging portion 24A at their lower ends. The upper end of vehicle engaging portion 24D is formed to fit into interior corner 23 and extend downwardly therefrom along the interior of the vehicle side wall for a significant length to provide an interior bearing surface for clamping engagement at that point. To facilitate that engagement with interior corner 23 and minimize the intrusion of clamp 24 into the vehicle bed area, clamps 24 are preferably formed to incline downwardly and outwardly from rails 22. A variety of fastener elements 24E can be used to secure rail engaging portion 24A and vehicle engaging portion 24D together, the hand manipulable type or "wing-nut" shown being one example.

The cover mounting hardware of the present invention releasably secures shell 12 and liner 14 to rails 22. Thus, to install the tonneau cover to the vehicle, rails 22 are first secured to the vehicle and then the cover is secured to the rails. Similarly, to remove the cover, first the cover is removed from the rails and then the rails can be, if necessary, removed from the vehicle. Alternatively, in applications where there is substantial space available between the underside of the tonneau cover and the vehicle bed, the cover and rails can be preassembled to each other and then placed onto the vehicle and then the rails can be clamped in place. The latter method has the advantage of simplifying component alignment if the rails are likely to be left in place when the cover is periodically removed. In either situation, the present invention has the advantage of being able to avoid the use of fasteners that penetrate the vehicle or that require the use of special tools or complicated procedures to install. Alternatively, in applications where it is desirable to prevent unauthorized removal of the tonneau, the present invention is readily adaptable to use of security fasteners which do require special tools for removal. Further, since each of rails 22 is mounted separately and independently of the other rails, a single person can install the entire rail mounting arrangement regardless of the width of the vehicle bed.

The cover mounting hardware includes a hinge assembly 30, a prop assembly 60 and a latch assembly 80. Preferably, each of rails 22 includes a set of each of these assemblies. Each such assembly is connected to the associated rail by means of fasteners 26, which can be conventional in nature, as described further below. Briefly, the present invention permits the cover to be pivotably hinged at the front of the vehicle bed by hinge assembly 30, with prop assembly 60 facilitating lifting of the cover for periodic access to the bed area under the cover. The cover can be closed and locked in place by latch assembly 80.

Hinge assembly includes a hinge element 32 having, for example, two side by side hinge flaps 34 and 36. In certain embodiments these flaps can instead be vertically disposed, but in especially preferred embodiments the side by side orientation permits a more vertically compact overall assembly. Biasing spring 38 is, for example, disposed between flaps 34 and 36 so as to urge them together in a common plane. Such biasing can be helpful in preventing damage to the vehicle during installation or removal of the cover since unintended motion of the hinge assembly is reduced. Hinge flaps 34 and 36 are joined together by longitudinally extending pin 40. In this manner, hinge element 32 can be formed as a conventional strap hinge.

Hinge flap 36 is mounted to the cover, such as by conventional fasteners into liner 14. Hinge flap 34 is, thus pivotably movable with respect to the cover about the longitudinal axis 42 of pin 40. A rotary latch assembly 44 is preferably secured to the underside of hinge flap 34. This rotary latch assembly can be of conventional design or of proprietary designs that are commercially available. One such suitable latch assembly is the Model 240/241 Mini Rotary Latch available from Eberhard Manufacturing Co. of Cleveland, Ohio. In essence, such latch assemblies include a spring locked hook than can receive and retain a bar, post, pin or other such "latch strikers" extending below the latch. The latch assembly is preferably mounted rearwardly on the flap sufficiently to clear the front wall of the vehicle bed. Also, it is preferable to orient the latch assembly to receive the retained bar from a position vertically above the retained bar and lock onto the retained bar by downward vertical motion. Thus, the cover can be held generally horizontal during mounting, with minimal risk of loss of user control due to gusts of wind and reduced wear on the peripheral seals of the cover.

Typically, such latch assemblies include a release lever 46 that permits selective disengagement of the hook from the retained bar. However, it has been discovered that use of conventional release levers can be difficult when rotary latch assemblies are applied to tonneau covers because of the restricted access space available to the user at the hinge location, especially when the user is holding the cover up at a more balanced location. Accordingly, the present invention provides a self-contained trip handle 48 which is connected at one end to release lever 46 and extends rearwardly along the cover. Preferably, handle 48 passes through a guide opening 49 at an inclined end 47 of hinge flap 34. Handle 48 is connected to release lever 46 such that pulling rearwardly on handle 48 can actuate release lever 46 to disengage the retained bar. Similarly, where a particular rotary latch assembly requires movement to a "reset" position after disengagement, handle 48 can be formed as a rigid unit to transmit pushing force for that purpose.

Hinge assembly 30 also includes a bracket 50 which supports and encloses a longitudinally extending hinge bar 52, which is used for engagement and retention by rotary latch assembly 44, through an open top 51 of the bracket. Hinge bar 52 is, for example, mounted intermediate the ends of bracket 50 and sufficiently below the open top that a significant portion of latch assembly 44 can be inserted into bracket 50 and shielded thereby during use. Hinge bar 52 includes two opposing guide discs 54 mounted on it and extending radially outward from the longitudinal axis 56 of the hinge bar, although preferably at a slight incline from a purely radially outward direction. Preferably, a spacer sleeve 57 is disposed on bar 52 between discs 54. Springs 58 are mounted on bar 52 between each disc 54 and the adjacent side wall of bracket 52. Bracket 50 is mounted to rail 22 by use of conventional fasteners 26.

When the tonneau cover is to be attached to rail mounting arrangement 20, the hook of each rotary latch assembly 44 is inserted into its associated bracket 50 to engage bar 52. The incline of discs 54 is sufficient to direct and guild or funnel that hook toward the center portion of the length of bar if the hook is laterally misaligned within a predetermined range. In this manner, bracket 50 is self-centering with respect to alignment with hinge element 32 and the tonneau cover. Such misalignment can occur, for example, as a result of thermal deformation of the cover. Also, springs 58 serve to absorb torsional stresses applied to the hinge as a result of vehicle vibration and motion during use.

Prop assembly 60 is provided to facilitate lifting of the tonneau cover to open it for temporary access to the interior of the vehicle bed and to support the cover "hands-free" in the open position. These purposes are conventional, and a variety of suitable gas-filled props are currently on the market. The present invention improves upon the prior prop assemblies by reducing the lifting force needed for prop actuation, by minimizing the prop bracket stresses applied to the vehicle, reducing the tendency for the prop member to urge the cover off of its side wall seals and by reducing the likelihood that the prop assembly will scratch or dent the vehicle during installation or removal of the tonneau cover.

Prop assembly 60 includes a prop member 62, preferably a gas filled piston of conventional design, a prop bracket 64, a prop pad 66, a retaining lanyard 68 and a prop clip 70. Pad 66 is, for example, secured to the underside of liner 14, and prop member 62 is pivotably secured to that pad at one end. The other end of prop member 62 is releasably and pivotably connected to the lower portion of bracket 64 by a conventional spring fastener 65. To prevent fastener 65 from being misplaced, lanyard 68 is secured to the fastener at one of its ends and to prop bracket 64 at its other end. Clip 70 is secured to liner 14 by, for example, a conventional adhesive at a location that is spaced apart from pad 66. Bracket 64 is secured at its upper portion to its associated rail 22 by conventional fasteners 26.

Preferably, bracket 64 retains prop member 62 in a substantially cantilevered position with respect to rail 22, in effect, spaced inwardly and lower than the rail within the vehicle bed area. This is accomplished in the embodiment of the drawings by use of a distinct inward bend or "dogleg" 72 in the cross-section of bracket 64 at a point intermediate its ends. Also, an outwardly extending connection pin 74 is attached to the lower portion of bracket 64 to pivotably retain prop member 62. For increased strength and rigidity, a reinforcing rib 76 is preferably formed in bracket 64 as well. It has been found that by such a configuration of bracket 64 there is significantly less of a tendency for the prop member to warp or deflect the bracket toward the vehicle side walls. Thus, the connection of the lower end of the prop member can be further from liner 14, permitting the use of longer, lower pressure prop members. Such longer prop members permit connection at the upper end closer to the rear of the cover, provide greater assistance to cover lifting and are less likely to urge the cover off of its side seals when the cover is closed.

Stated differently, bracket 64 has the advantage of being connected directly to mounting arrangement 20 so it can be removed integrally therewith from the vehicle. At the same time, bracket 64 permits the lower end of the prop member to be connected substantially below liner 14, and thereby maximize its lifting function. In doing this, bracket 64 is formed so as to avoid both the destructive twisting effect on rails 22 and the destructive rubbing effect on the vehicle side walls that would be presented by merely elongating prior brackets. This formation of bracket 64 includes inward bend 72, of sufficient horizontal dimension as to permit the lower end of prop member 62 to clear rails 22 in use and still terminate nearly vertically in line with the rails, and pin 74, placed to translate at least a portion of the non vertical force from prop member 62 inwardly, rather than outwardly.

When the cover is to be removed from rail mounting arrangement 20, prop member 62 is removed from pin 74 and then rotated toward liner 14 in the direction of clip 70. Preferably, clip 70 is formed with a resilient-walled recess 77 which is sized to receive a portion of prop member 62 and an overlapping catch 78 to restrict removal of prop member 62 from recess 77 except when opening force is applied by the user to clip 70 via catch 78. According to preference in a given application, clip 70 can be secured to liner 14 such that recess 77 opens outwardly or inwardly.

Latch assembly 80 preferably includes elements that are mounted on and adjacent to each of rails 22 and simultaneously actuated by a central squeeze handle 82 mounted on the top rear portion of cover 12. Rear latches 84 are positioned under liner 14 at each of the rear corners. These latches can be of any conventional or commercially available proprietary design and are intended to releasably engage a bar or pin attached which serves as a latch catch. In especially preferred embodiments, these latches can be of the same type as rotary latches 44. Cables or rods of conventional nature operably connect handle 82 and rear latches 84. In general, the rear latches are spring biased to receive and retain the latch catches and thereby fix the tonneau cover with respect to each of the latch catch. Since each latch catch is fixed with respect to the vehicle body, this allows the rear latches to hold the cover in a closed position over the vehicle bed. To open the tonneau cover, handle 82 is actuated to cause the rear latches to release the latch catch, permitting the cover to be lifted by pivoting about hinge assembly 30.

However, due to thermal expansion and contraction of the cover in various weather conditions, tending, for example, to cause bowing or sagging of the cover as well as variation in overall length and width, the relative position of the rear latches and latch catches can vary over time. Since the hinge assembly fixes the cover at one end, the dimensional variance can be most noticeable at the vehicle rear. As a result, the cover may not always be properly latched in place. To remedy this, the present invention includes rear catch brackets 86, one mounted to each of rails 22, for example, by conventional fasteners 26. Brackets 86 include a base plate 88 with a length of catch bar 90 extending therefrom and formed with an inclined U shape. Catch bars 90 extend inwardly of the vehicle bed and are inclined in the direction that cover deformation will move the position of the rear latches. Thus, as the position of the rear latches changes in changing temperature, each rear latch will engage a different portion of its associated catch bar 90, but still achieve secure retention of the cover to the vehicle.

To counteract certain of the effects of thermal deformation on the sides of the cover, the present invention can include dampening or weight load bars 92 mounted to liner 14 intermediate the front and rear of the cover and adjacent the vehicle sides. Alternatively, load bars 92 are formed from magnetic material so as to encourage retention of the cover to the vehicle at that point. These load bars can be secured between liner 14 and cover 12. In effect, these load bars serve to exert a pull down force on the cover intermediate the front and rear.

Further thermal deformation effects can be countered by use of leveling projections or nibs 94 that are attached to or molded into the underside liner 14 at adjacent its sides to engage the top surface of the vehicle side walls at spaced apart locations. In effect, these nibs tend to push the sides of the cover upward intermediate the front and rear.

Although the present invention has been described above in detail with respect to particular embodiments, this was done only by way of illustration and example. Those of ordinary skill in the art of designing tonneau covers will now recognize that various modifications of these examples can be readily constructed for particular applications. For example, rails 22 have been shown as each being a unitary construction over the length of the vehicle bed side. Alternatively, rails 22 could be sectioned into portions only of sufficient length along the vehicle bed side to support the rail mounting arrangement, perhaps saving rail material in exchange for additional clamps. Similarly, rotary latch mechanisms have been suggested for the hinge and rear latch functions, but gate and hook/eye latches can be substituted in given applications. Accordingly, the spirit and scope of the present invention are limited only by the terms of the claims defined below and in any related patent applications.

What is claimed is:

1. An improved arrangement for mounting tonneau covers and the like to the bed of a pick up truck type vehicle, comprising:

first and second spaced-apart front mounting bracket assemblies for releasable attachment of the front portion of the tonneau cover to the vehicle at discrete locations, each such bracket assembly including a rotary latch member mounted on a strap hinge, that strap hinge being secured to the front portion of the tonneau cover, a self-centering bracket member mounted on a rail, that rail being releasably clampable to the of vehicle side wall, and a self-contained trip handle extending from the rotary latch member to selectively disconnect the rotary latch member from the bracket member, a prop bracket member with means for improved distribution of tonneau cover weight away from the vehicle side wall, including a removable, cantilevered connection of the prop bracket member to the vehicle below the level of the rail and substantially inwardly therefrom, means for releasably securing the prop to the tonneau when the prop is disconnected from the prop bracket, at least one rear catch bracket mounted t o a rail with engagement means to accommodate latch alignment in response to longitudinal and lateral thermal expansion of the tonneau cover, that engagement means including an inwardly inclined catch arm for releasable connection to a rear locking member mounted to the tonneau cover, means for counteracting bowing and sagging of the tonneau cover through the application of counteracting forces during use, including weighted portions intermediate the front and rear of the tonneau cover and leveling nibs along the rails, and the rails having contoured cross-sectional configurations to closely match the vehicle side wall portion to which the rails abut.

2. The arrangement according to claim 1 wherein the tonneau cover is formed from an outer shell molded from Telene material and bonded to an inner liner formed from ABS material, that inner liner having a spoking trapezoid configuration for increased rigidity against the application of downward force to the tonneau cover.

3. The arrangement according to claim 1 wherein the prop bracket member is secured at one end to a rail and extends to another end for receiving the prop along a interiorly directed dogleg, as that configuration is viewed from a cross-sectional perspective.

4. The arrangement according to claim 1 wherein the means for counteracting bowing includes magnets attached to the underside of the tonneau.

5. The arrangement according to claim 1 wherein clamping means are provided to secure the rails to the vehicle which engages an interior corner of the vehicle side wall.

6. A releasable bracket arrangement, for pivotably connecting a tonneau cover to a vehicle, comprising:

a hinge having a first portion and a second portion, those portions being relatively movable with respect to each other, a releasable latching member attached to the first portion for receiving and retaining a latchable element, a bracket having an opening therein and a latchable element mounted within that opening, the opening being dimensioned so as to receive a portion of the latching member.

7. The arrangement according to claim 6 wherein the second portion of the hinge is fixed with respect to the tonneau cover, a rail is provided which is attachable to the vehicle and the bracket is fixed with respect to the rail.

8. The arrangement according to claim 7 wherein a rear latch assembly is provided to control pivoting of the hinge with respect to the bracket for opening and closing of the tonneau cover, the rear latch assembly including a selectively actuatable rear latch member and a catch bracket dimensioned to be received and releasably retained by the rear latch member at a plurality of rear latch member positions.

9. The arrangement according to claim 8 wherein a support assembly is provided to reduce the force necessary to pivot the hinge with respect to the bracket, the support assembly including a prop and a prop bracket, the prop bracket being fixed with respect to the rail and including a connection for receiving the prop at a location below and spaced laterally away from the rail.

10. An arrangement for mounting a cover to a portion of a vehicle, comprising:

first and second rail elements mountable at spaced apart locations on the vehicle, a bracket mounted to each rail, first and second hinges mounted to the cover, a latch mounted to each hinge for releasably retaining a receiving element, a receiving element mounted within each bracket, and means for selectively controlling the movement of the cover with respect to the vehicle when the receiving elements are retained by the latches.

* * * * *